(12) United States Patent
Mabry et al.

(10) Patent No.: US 6,884,325 B1
(45) Date of Patent: Apr. 26, 2005

(54) SEALABLE LID FOR VACUUM DISTILLATION APPARATUS

(75) Inventors: Michael D. Mabry, Marietta, GA (US); Donald R. McAllister, Waleska, GA (US)

(73) Assignee: IHS Solvent Solutions, Inc., Ball Ground, GA (US)

( * ) Notice: Subject to any disclaimer, the term of this patent is extended or adjusted under 35 U.S.C. 154(b) by 0 days.

(21) Appl. No.: 09/545,137

(22) Filed: Apr. 7, 2000

Related U.S. Application Data

(60) Provisional application No. 60/128,818, filed on Apr. 12, 1999.

(51) Int. Cl.⁷ .......................... C10B 25/00; B65D 45/00
(52) U.S. Cl. ........................ 202/242; 202/243; 202/244; 202/246; 220/315; 220/318; 220/321; 220/322; 220/323; 220/324; 220/325; 220/327; 220/810; 114/201 R; 105/377.01
(58) Field of Search ................................. 202/242, 243, 202/244, 246; 220/315, 318, 321, 322, 323, 224, 325, 327, 810; 114/201 R; 105/377.01

(56) References Cited

U.S. PATENT DOCUMENTS

| | | | |
|---|---|---|---|
| 264,695 A | 9/1882 | Henkel | |
| 664,775 A | 12/1900 | Penfield | |
| 1,070,128 A | 8/1913 | Gross | |
| 1,124,606 A | * 1/1915 | Gardner | 585/801 |
| 2,846,112 A | 8/1958 | Eisenman | |
| 2,883,084 A | * 4/1959 | Shankland | 220/324 |
| 3,262,227 A | 7/1966 | Pentecost | 49/354 |
| 3,436,318 A | 4/1969 | Glass | |
| 3,441,166 A | * 4/1969 | Frees | 220/324 |
| 4,204,913 A | 5/1980 | Sabatka | |
| 4,488,933 A | 12/1984 | Claunch et al. | |
| 4,666,562 A | 5/1987 | Nelson | |
| 4,693,786 A | 9/1987 | Brett | |
| 5,308,452 A | 5/1994 | Marks et al. | |
| 5,429,720 A | 7/1995 | Mertens | |
| 5,551,706 A | * 9/1996 | Barna et al. | 277/312 |
| 5,586,678 A | 12/1996 | Rosch et al. | |
| 5,988,423 A | * 11/1999 | Auzureau | 220/233 |
| 5,997,003 A | * 12/1999 | Turner | 277/339 |
| 6,003,461 A | * 12/1999 | Blanchette et al. | 114/117 |
| 6,053,348 A | * 4/2000 | Morch | 220/263 |
| 6,085,935 A | 7/2000 | Malchow et al. | |
| 6,427,384 B1 | 8/2002 | Davis, Jr. | |

* cited by examiner

Primary Examiner—Glenn Caldarola
Assistant Examiner—Alexis Wachtel
(74) Attorney, Agent, or Firm—Womble Carlyle Sandridge & Rice, PLLC

(57) ABSTRACT

A sealable lid assembly for a vacuum distillation apparatus has a lid pivotally and telescopically mounted to the vacuum distillation apparatus. Spaced-apart wheels are rotatably mounted to the lid. Tracks are disposed on the vacuum distillation apparatus in a position to engage the wheels and raise the lid vertically above a manhole of the vacuum distillation apparatus upon pivotal movement of the lid, which is initiated by nominal physical exertion of a single operator. Extending outwardly from and adjacent the manhole is a flange. The flange has a channel to receive a gasket. A protrusion extends outwardly from a bottom of the lid in a position to extend into the channel and sealably engage the gasket when the wheels disengage the tracts. Clamp assemblies are provided to releasably engage the lid with the flange and draw the protrusion into sealable, releasable engagement with the gasket. The gasket can be an endless type or non-endless type with obtuse faces oppositely and matingly positioned adjacent one another in the channel. A handle extends outwardly from the lid to assist the operator in pivotally moving the lid.

20 Claims, 5 Drawing Sheets

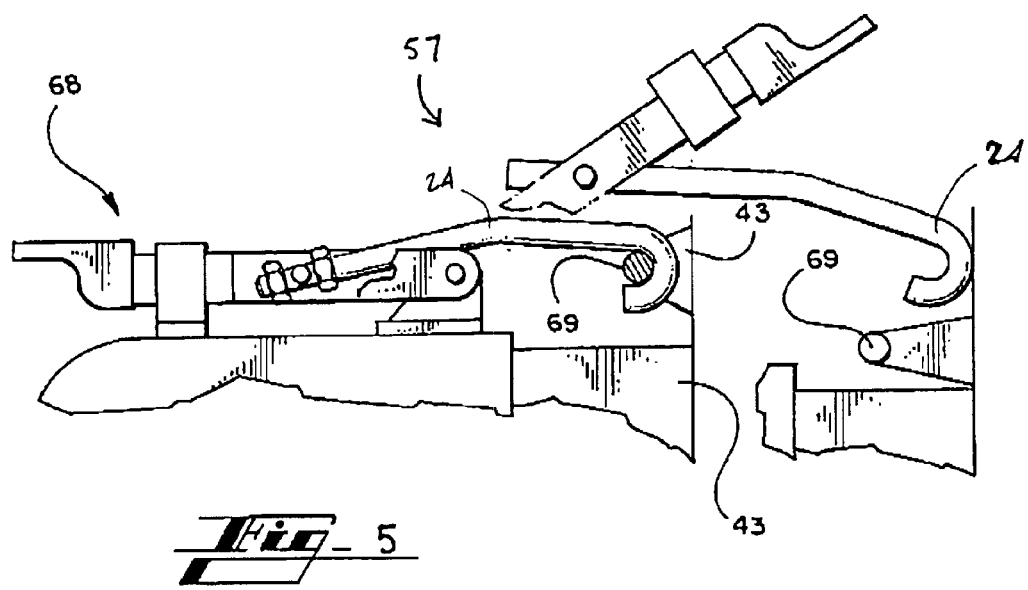
Fig_5
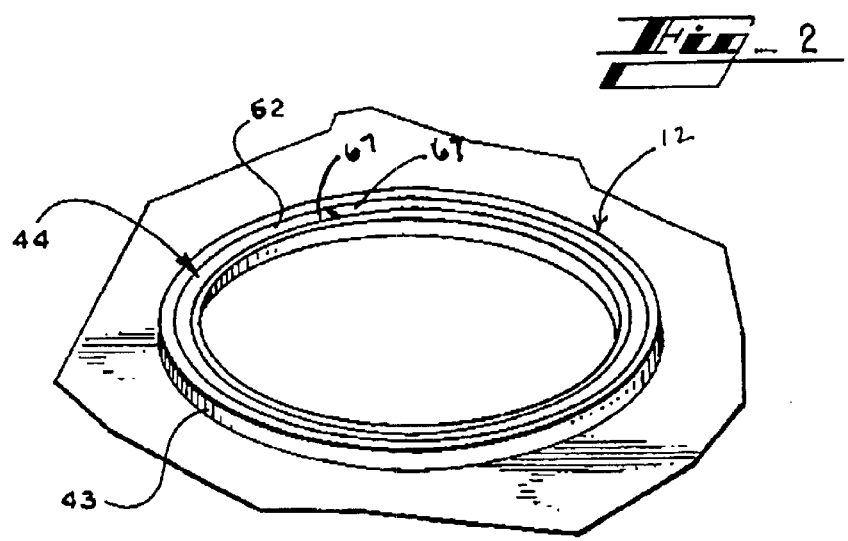
Fig_2

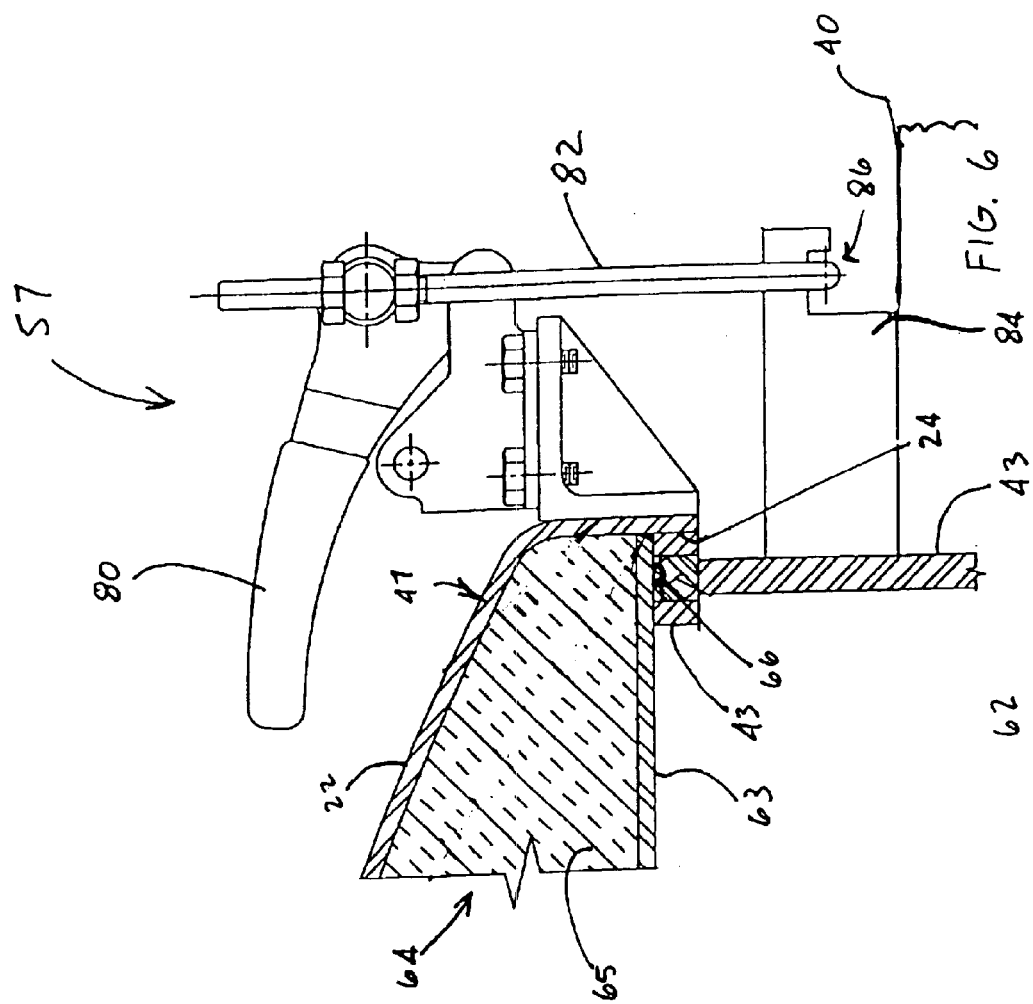

SEALABLE LID FOR VACUUM DISTILLATION APPARATUS

This application claims benefit of U.S. Provisional Patent Application No. 60/128,818 filed Apr. 12, 1999, which is incorporated herein by reference.

FIELD OF THE INVENTION

The present invention relates generally to the field of manhole covering devices. More particularly, the present invention relates to a device for sealing a manhole of a vacuum still utilized in the recovery of a photopolymer solvent.

BACKGROUND OF THE INVENTION

It is known in the prior art to produce printing plates from acrylic elastomer resins and synthetic rubbers utilizing photoengraving and chemical milling techniques. Generally, a layer of such resins or rubbers are placed onto a surface of a flexible plate and then exposed to light through a photographic film or stencil having a desired pattern to be formed onto the printing plate. Exposure of the resins and rubbers to light cures the resins and rubbers, altering the susceptibility of the resins and rubbers to removal by a photopolymer solvent. By applying the photopolymer solvent to the light exposed layer of resins or rubbers on the printing plate, the uncured photopolymer resin or rubber is chemically etched away by the photopolymer solvent in a pattern reverse to that of the film or stencil. The resin or rubber etched from the plate is removed with the waste photopolymer fluid.

Typically, the solvents utilized for the photopolymer solvent are relatively costly and generally have flash point temperatures above 140° F. Further, disposal of the waste photopolymer fluid is likewise relatively expensive and presents environmental problems and concerns. Therefore, to more efficiently produce the aforementioned printing plates, devices were developed to recover the photopolymer solvent from the waste photopolymer fluid.

Prior art photopolymer solvent recovery apparatus utilize vacuum assisted distillation typically within a still to separate the photopolymer solvent from the photopolymer resins or rubbers. Upon separation and removal of the photopolymer solvent, the residue resins or rubbers remain in the device as a concentrated residue. Typically, the residue is removed from the device by gravity flow through a drain. Due to the relative cost of the photopolymer solvent, the operator desires to maximize solvent recovery, however, the recovery of the photopolymer solvent is limited. Over a period of time, concentrated resins or rubbers can coalesce into an amorphous solid residue and cake onto internal surfaces and parts of the still. Once the solid is formed, the apparatus can not be operated until the operator enters and manually removes the solid from the device. Further, because the distillation process involves cyclic heating, it is desirable to periodically inspect the internal structure and parts of the distillation device for signs of structural fatigue. Generally, internal access to the distillation device by the operator is gained through a manhole which utilizes a removable closure.

In the photopolymer solvent recovery industry, recent innovations have been primarily directed to maintaining residue fluidity while attempting to maximize photopolymer solvent recovery. However, very little attention has been given to the manhole and closure of the distillation apparatus. Typically, manhole and closure assemblies consist of a manually adjustable threaded closure which releasably engages mating threads located around the perimeter of a rim extending upwardly proximate the manhole. The fastener assemblies secure the closure on the distillation apparatus and seal the interior thereof. A center speed ball handle lifts the closure from the apparatus, with the fasteners disconnected, and swings away from the open top of the tank on a davit arm. An example of such a manhole and closure assembly is described in U.S. Pat. No. 5,308,452 to Marks et al.

In our pending U.S. patent application Ser. No. 09/151,222 filed Sep. 10, 1998, entitled "Modular Solvent Recovery Device", a manhole device is described which removably covers and seals a manhole of a still which can be quickly and easily engaged by a single operator. The manhole device comprises a pivotally and telescopically mounted closure which removably engages an annular flange extending outwardly from the still at the manhole. Wheels rotatably mounted to the closure engage tracks, which are positioned on the still, to raise the closure vertically above the manhole upon pivotal movement of the closure. The tracks have rounded or tapered shoulders at their proximal ends to immediately engage the wheels upon initiation of pivotal movement of the closure. As the closure pivots by a relatively nominal physical effort by the operator, the wheels engage the respective shoulders and cause the closure to disengage and vertically rise above the flange. As the closure continues to pivot, the wheels roll along the tracks to clear the closure from obstructing the manhole. A stop mounted to at least one of the tracks proximate its distal end engages the closure to terminate pivotal movement beyond the stop. A foam-covered handle extends outwardly from the closure to assist the operator in pivoting and raising the closure. To assist in sealing the closure to the flange, a gasket is disposed between the closure and the rim. Clamps are pivotally mounted to the still adjacent the flange to releasably engage the closure and contract the closure into sealable engagement with the flange. By pivoting the closure away from the stop, the wheels roll upon and disengage the respective tracks at the shoulders, thereby permitting the closure to drop and seat on the flange and form a sealable engagement with the manhole upon clamping. Unfortunately, because the gasket must rest upon the flange to form the seal, the gasket is not secure from movement along the flange upon pivotal action of the closure. This can result in a poor seal and/or a damaged gasket. In an effort to secure the gasket from movement, the closure can be provided with an annular groove disposed adjacent a periphery thereof to receive the gasket. However, the gasket can slip downwardly or even fall from the groove due to gravitational forces, particularly when the gasket is pliant due to heating, and again result in a poor seal and/or damaged gasket. Further, because the gasket must rest upon the flange, a costly endless annular gasket is generally required to form the seal.

Despite existing manhole and closure assemblies, the need remains for a sealable lid for a vacuum distillation apparatus which secures a gasket from movement and removably covers and seals a manhole of the distillation apparatus or other vessel which can be quickly and easily released from, moved about, and engaged with the manhole by nominal physical effort of a single operator. Further, there remains a need for such a device which permits utilization of a non-endless gasket. Accordingly, it is to the provision of a sealable lid for a vacuum distillation apparatus that meets these needs that the present invention is primarily directed.

SUMMARY OF THE INVENTION

This invention overcomes the disadvantages of the prior art by providing a sealable lid assembly for a manhole of a vacuum distillation apparatus utilized to recover photopolymer solvent. The sealable lid assembly comprises a flange having an exterior surface and an interior surface surrounding the manhole and extending outwardly from the vacuum distillation apparatus to a distal end. A channel is positioned on either the exterior or interior surfaces of the flange proximate the distal end to receive a gasket, such as a TEFLON gasket. Proximate the manhole is a shaft which extends outwardly from the vacuum distillation apparatus. A lid is pivotally and telescopically mounted to the shaft and is capable of releasably and sealably engaging the flange. The lid has a substantially dome-shaped top and a substantially planar bottom, and the top and bottom in combination define a chamber within the lid. Insulation may be disposed within the cavity. A protrusion extends outwardly from a bottom of the lid in a position to extend into the channel and sealably engage the gasket. Spaced-apart wheels are rotatably mounted to the lid. Tracks are disposed on the vacuum distillation apparatus in a position to engage the wheels and raise the lid vertically above a manhole of the vacuum distillation apparatus upon pivotal movement of the lid, which is initiated by nominal physical exertion of a single operator. Clamp assemblies are disposed on the lid and the vacuum distillation apparatus to releasably contract the protrusion into sealable, releasable engagement with the gasket. The gasket can be an endless type or non-endless type with obtuse faces oppositely and matingly positioned adjacent one another in the channel. A handle extends outwardly from the lid to assist the operator in pivotally moving the lid.

Thus, a unique sealable lid assembly is now provided that successfully addresses the shortcomings of existing manhole closures and provides distinct advantages over such manhole closures. Additional objects, features, and advantages of the invention will become more apparent upon review of the detailed description set forth below when taken in conjunction with the accompanying drawing figures, which are briefly described as follows.

BRIEF DESCRIPTION OF THE DRAWINGS

FIG. 2 is a partial perspective view a manhole on the vacuum distillation apparatus.

FIG. 5 is a partial side elevation view of the lid and an engaged J-clamp and the J-clamp released from the vacuum distillation apparatus.

FIG. 6 is a partial side elevation view of the lid and and an engaged U-clamp.

DESCRIPTION OF THE PREFERRED EMBODIMENTS

Figure 1:
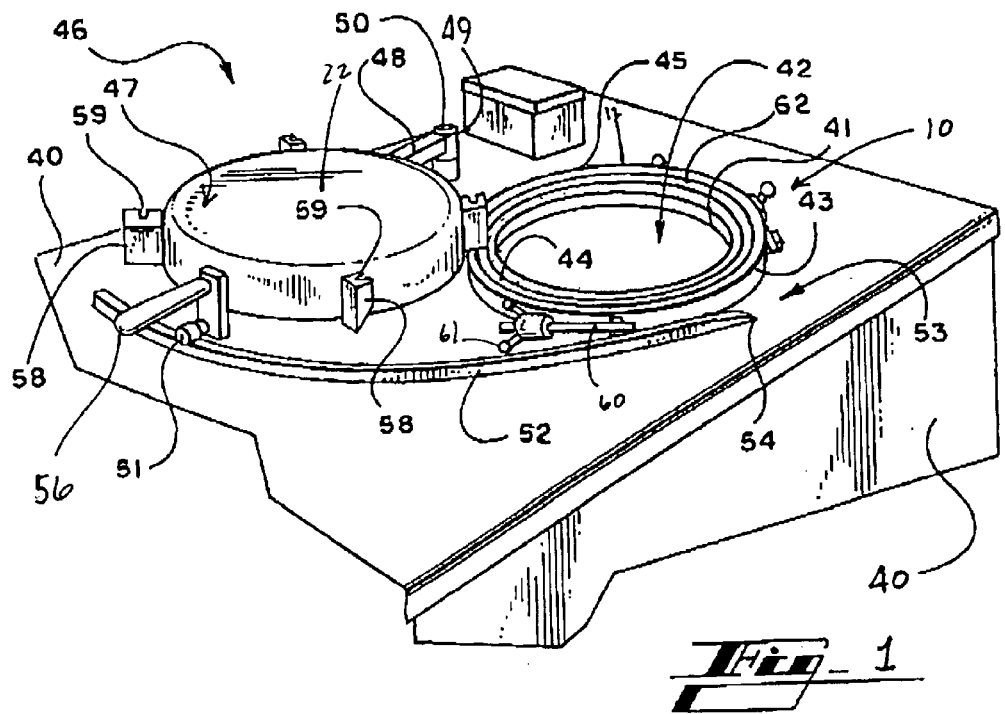
FIG. 1 is a partial perspective view of a sealable lid assembly made in accordance with the present invention disposed on a vacuum distillation apparatus.

For a more complete understanding of the present invention, reference should be made to the following detailed description taken in connection with the accompanying drawings, wherein like reference numerals designate corresponding parts throughout the several figures. Referring first to FIG. 1, a sealable lid assembly 46 made in accordance with the present invention is shown mounted to a vacuum distillation apparatus 40 of a solvent recovery device (not shown) which is operably connected in fluid communication with a conventional plate processor (not shown). An example of such a modular solvent recovery device and its operation is discussed in U.S. patent application Ser. No. 09/151,222, which is incorporated herein in its entirety by reference. The plate making process that takes place in the plate processor is conventional, is not a part of the present invention, and therefore, is not described in detail. The component parts of the device are connected in operative fluid communication with the plate processor through a solvent feed conduit and a waste photopolymer fluid conduit. The solvent feed conduit transports solvent from the device to the plate processor, and the waste photopolymer fluid conduit transports waste photopolymer fluid generated during plate making operations of the plate processor to the device.

Figure 3:
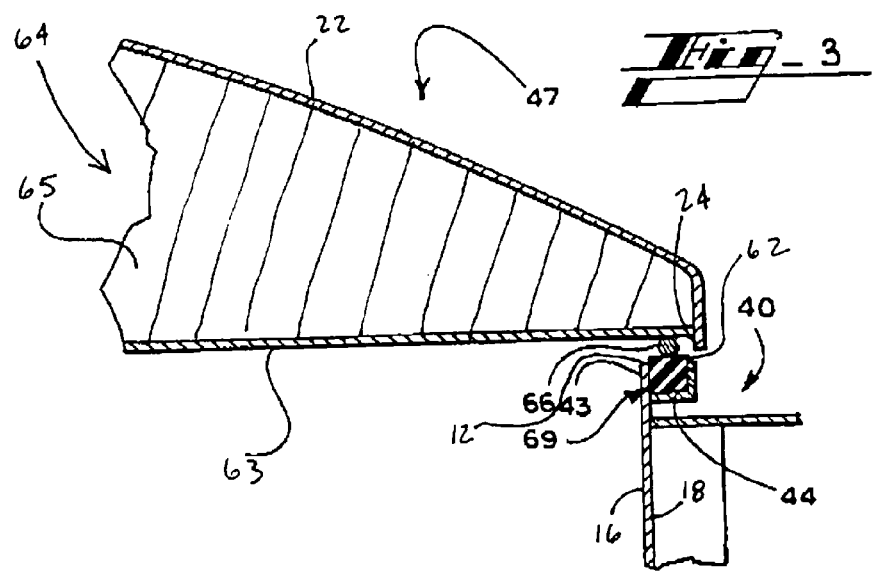
FIG. 3 is a partial side view of a lid sealably engaging a gasket disposed within a channel of a flange.

Referring additionally to FIGS. 2 and 3, the vacuum distillation apparatus 40, also known as a still, comprises a sealable pressure vessel having an apparatus interior 41 accessible through an opening 42 located at the top of the apparatus 40. Extending outwardly from the apparatus 40 and surrounding the opening 42 is a annular flange 43 which has an inner surface 16, an outer surface 18, and terminates at a distal end 12. The flange 43 and the opening 42 in combination define a manhole 10. A generally L-shaped wall 14 extends outwardly and upwardly from the flange 43 proximate the distal end 12. The L-shaped wall 14 and the flange 43 in combination define a channel 44. As shown in FIG. 1, the L-shaped wall extends from the inner surface 16, and as shown in FIG. 3, the L-shaped wall extends from the outer surface 18.

During operation, the manhole 10 is sealed by a sealable lid 47 made in accordance with the present invention. The lid 47 is pivotally and telescopically mounted to the apparatus 40 adjacent the flange 43. Extending outwardly from the lid 47 is an arm 48 having a mounting cylinder 49 which pivotally and slidably engages a shaft 50 extending outwardly from the apparatus 40. As additionally shown in FIG. 4, oppositely and rotatably mounted to the lid 47 are two spaced-apart wheels 51. Two elongated, spaced-apart tracks 52 extend upwardly from the apparatus 40 proximate the flange 43 along the respective paths of the wheels 51 to engage the wheels 51 as the lid 47 pivots away from the manhole 42. At a proximal end 53 of the tracks 52 are rounded shoulders 54 positioned to engage the wheels 51 upon pivotal movement of the lid 47. An elongated ramp 20 extends from the shoulder 54 along an angle of about 30° to about 60°, preferably 45°, with respect to the distal end 12 of the flange 43 to reduce the amount of force needed by the operator to pivot the lid 47. The ramp 20 terminates at an apex 21, which is sufficiently vertically disposed above the apparatus 40 so that the lid 47 pivots freely without striking any obstruction thereon. Alternatively, the ramp 20 can extend from the apparatus 40 to the apex 21 without a shoulder 54 being present. As the lid 47 pivots, the wheels 51 engage the respective shoulders 54 and cause the lid 47 to vertically rise above the flange 43 and roll along the tracks 52 to clear the lid 46 from obstructing the manhole 10. Because the wheels 51 are oppositely disposed on the lid 47, the mounting cylinder 49 slides upwardly along the shaft 50 with minimal binding. At least one stop 55 is optionally mounted to one of the tracks 52 to engage the respective wheel 51 and prevent the lid 47 from pivoting beyond the track 52. If the stop 55 is absent, the shaft 50 should be reinforced to support the weight of the lid 47. A handle 56 extends outwardly from the lid 47 to assist a single operator in pivoting and raising the lid 47. The handle 56 is foamed covered for improved gripping capability by the operator.

Referring again to FIGS. 1 and 3, the lid 47 has a substantially dome-shaped top 22 and a lid bottom 63, thereby forming a chamber 64. A lip 24 extends beyond the lid bottom 63 which at least partially covers the flange 43 while the lid 47 is engaged therewith. Insulation 65 is disposed within the chamber 64 is to retain heat within the apparatus 40. Extending outwardly from the lid bottom 63 is an annular protrusion 66, which inserts into the channel 44 when the lid 47 is disposed over the manhole 42 and the wheels 51 disengage the tracts 52. A gasket 62 is disposed within the channel 44 to assist in sealing the lid 47 to the flange 43. As mentioned above, the protrusion 66 projects into the channel 44 to engage the gasket 62 and form the lid 47/flange 43 seal.

Figure 4:
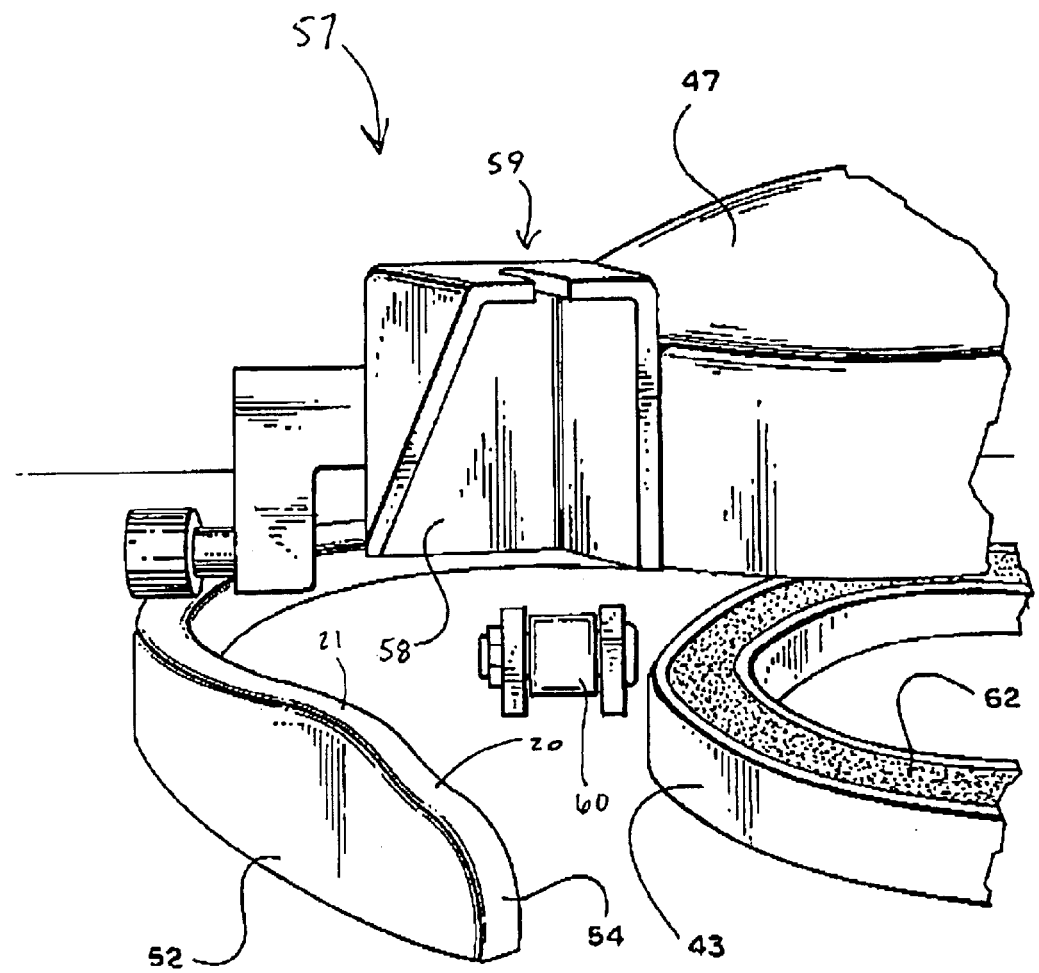
FIG. 4 is a partial perspective view of the lid with a wheel engaging a track.

A plurality of clamp assemblies 57 are provided to contract the lid 47 into sealable engagement with the flange 43. As illustrated in FIGS. 1 and 4, in one embodiment, the clamp assembly 57 comprises receivers 58 having U-shaped slots 59 mounted to the lid 47. Pivotally mounted to the apparatus 40 are threaded bolts 60 which are removably placeable into the slots 59. Matingly threaded wing nuts 61 are adjustably disposed on the bolts 60. Upon rotation of the nuts 61 in one direction, the nuts 61 respectively engage the receivers 58 and exert pressure against the receivers 58 to seal the lid 47 to the flange 43. That is, the protrusion 66 is drawn into the channel 44 to sealably engage the gasket 64. Rotating the nuts 61 in the opposite direction releases the pressure and enables the bolts 60 to be pivoted and removed from the slots 59 so that the lid 47 may be unseated from the flange 43. As the lid 47 is pivoted in the opposite direction from the stop 55, the wheels 51 rollingly engage the respective tracks 52 and disengage the tracks 52 at the shoulders 54, permitting the lid 47 to seat on the rim 45 of the flange 43 and seal the manhole 42.

Now, referring to FIG. 5, the clamp assembly 57 may also comprise a lockable J-clamp 68 mounted to the lid 47. Such J-clamps, generally referred to as latch action clamps, have adjustable hooks 24 to controllably vary the clamping pressure of the clamp and are manufactured by DE-STA-CO Industries, Birmingham, Mich., (model numbers 330, 351, 371, and 381). The J-clamps 68, which can have lockable levers, removably engage clamp pins 69, which are mounted to the apparatus 40, to draw the protrusion 66 into sealable engagement with the gasket 62. Upon releasing the respective levers, the J-clamps 68 can be disengaged from the clamp pins 69 to release the lid 47.

Figure 7:
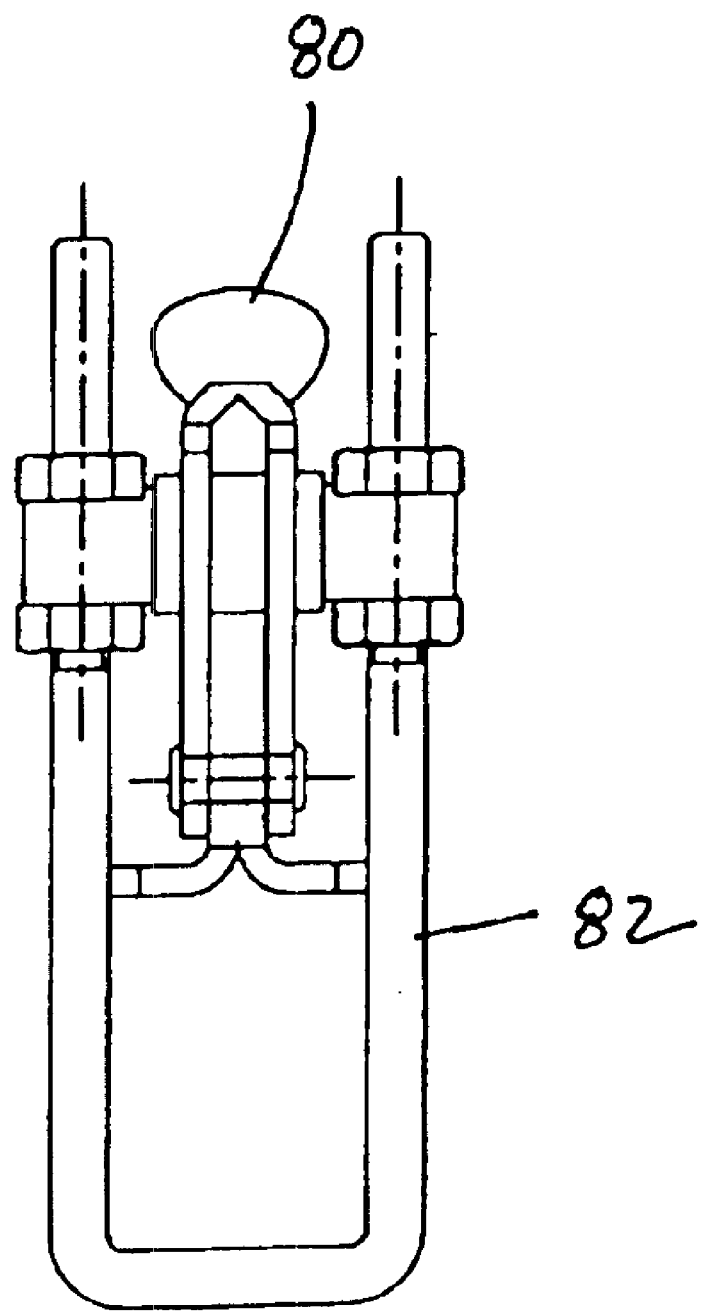
FIG. 7 is a front elevtion view of the U-clamp of FIG. 6.

As shown in FIGS. 6 and 7, the clamp assembly 57 can also comprise a U-clamp 80 mounted to the lid 47. Such U-clamps 80, generally referred to as latch action or pull action clamps, have adjustable U-shaped bars 82 to controllably vary the clamping pressure of the clamp and are manufactured by DE-STA-CO Industries, Birmingham, Mich., (model numbers 324, 334, 344, 374, 331-R and 341-R). The U-clamps 80, which can have lockable levers, respectively, removably engage slots 86 of clamp stays 84, which are mounted to the apparatus 40 adjacent the flange 43, to draw the protrusion 66 into sealable engagement with the gasket 62. Upon releasing the respective levers, the U-clamps 80 can be disengaged from the clamp stays 84 to release the lid 47.

Solvents are employed in the plate processor to dissolve portions of a synthetic polymeric resin plate exposed to light in a photopolymer plate making process. The waste photopolymer fluid received by the device from the plate processor contains a mixture of the selected solvent and photopolymer solids consisting of acrylic elastomer resins and synthetic rubber. The photopolymer solids are soluble in the selected solvent.

A heating assembly (not shown) heats the apparatus 40 and the contents of the apparatus interior 41. As the temperature of the oil contained in the jacket is increased by the heater, the apparatus 40 and the material contained in the apparatus interior 41 are heated by conduction.

Vacuum pressure is created in the apparatus 40 by a vacuum pump (not shown) sufficient to draw waste photopolymer into the apparatus 40. A solvent discharge conduit (not shown) communicates with the apparatus interior 41 and extends to the vacuum pump. The vacuum pump provided in the solvent discharge conduit creates a vacuum pressure in the solvent discharge conduit and the apparatus 40. The clamp assemblies should provide sufficient pressure while engaged to seal the lid 47 to the flange 43. The vacuum pressure draws distilled solvent from the apparatus interior 41.

As the apparatus 40 distills the waste photopolymer fluid, solvent is removed from the apparatus 40 and the waste photopolymer fluid is reduced to the concentrated residue, which can coalesce into an amorphous solid residue and cake onto internal surfaces and parts of the apparatus 30. The desired solvent to be distilled may be any number of commercially available solvent blends, including the widely used prior art solvent blend of alcohol-perchloroethylene. Examples of some commercial solvents typically employed in plate making operations by plate processors to dissolve portions of the photopolymer coated plate include solvents marketed under the tradenames OPTISOL, distributed by DuPont Company; SOLVIT, distributed by Polyfibron Technologies, Inc.; and NUTRE CLEAN, distributed by NuPro Technologies. The gasket 62 should be made from a material which is inert to and non-soluble in the photopolymer solvent, particularly at elevated temperatures above ambient. Preferably, the gasket at least has a coating made of tetrafluoroethylene fluorocarbon polymers, fluorinated ethylene-propylene resin, or a mixture thereof, which are marketed under the tradename TEFLON. Typically, such TEFLON coated gaskets have a silicone rubber core. Optionally, the gasket 62 may comprise a braid of fibers or strands made from tetrafluoroethylene fluorocarbon polymers, fluorinated ethylene-propylene resin, or a mixture thereof.

Referring again to FIG. 2, the gasket 62 can be an endless, annular gasket or can be an elongated strip having two ends 67. The ends 67 have faces (not shown) disposed at obtuse angles with respect to the elongated portion of the gasket 62 so that the faces oppose one another when the gasket is placed in the channel 44.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Further, the various components of the embodiments of the invention may be interchanged to produce further embodiments and are these further embodiments are intended to be encompassed by the present invention.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A sealable lid assembly for a manhole of a vessel, comprising:
    a flange surrounding the manhole and extending outwardly from the vessel to a distal end;
    at least one wall extending from the flange proximate the distal end to define a channel;
    a shaft extending outwardly from the vessel proximate the manhole;
    a lid pivotally and telescopically mounted to the shaft capable of releasably and sealably engaging the flange;
    a protrusion extending outwardly from the lid and insertable into the channel;
    at least one wheel rotatably mounted to the lid;
    at least one elongated track extending outwardly from the vessel in a position to engage the at least one wheel and raise the lid vertically above the flange as the lid pivots; and
    at least one clamp assembly releasably contracting the lid into sealable engagement with the flange.

2. The sealable lid assembly as claimed in claim 1, further comprising a handle extending outwardly from the lid for assisting an operator in pivoting the lid.

3. The sealable lid assembly as claimed in claim 1, wherein two wheels rotatably mounted to the lid and two spaced-apart tracks are disposed on the vessel in positions to respectively engage the wheels, whereby binding of the lid is reduced as the lid pivots and moves vertically along the shaft.

4. The sealable lid assembly as claimed in claim 1, further comprising a gasket disposed within the channel releasably and sealably engaging the protrusion.

5. The sealable lid assembly as claimed in claim 4, wherein the gasket either comprises or is coated with a tetrafluoroethylene fluorocarbon polymer, a fluorinated ethylene-propylene resin, or a mixture thereof.

6. The sealable lid assembly as claimed in claim 1, wherein the at least one clamp assembly comprises:
    a threaded bolt pivotally mounted to the vessel;
    a wing nut having mating threads rotatably disposed on the bolt; and
    a receiver mounted to the lid and having a U-shaped slot capable of receiving the bolt, whereby the lid is sealed by placing the bolt into the U-shaped slot and rotating the wing nut in one direction to exert pressure against the receiver and released by rotating the wing nut in the opposite direction and pivoting the bolt out of the U-shaped slot.

7. The sealable lid assembly as claimed in claim 1, wherein the at least one clamp assembly comprises:
    a clamp pin mounted to the vessel and
    a J-shaped clamp positioned on the lid to removably engage the clamp pin,
    whereby the lid is sealed by engaging the J-shaped clamp with the clamp pin and released by disengaging the J-shaped clamp from clamp pin.

8. The sealable lid assembly as claimed in claim 1, wherein the lid comprises a substantially dome-shaped top and a substantially planar bottom, wherein the top and bottom in combination define a chamber.

9. The sealable lid assembly as claimed in claim 8, further comprising insulation disposed within the cavity.

10. The sealable lid assembly as claimed in claim 8, wherein the protrusion extends from the bottom.

11. The sealable lid assembly as claimed in claim 1, wherein the at least one track has a rounded shoulder and an elongated ramp extending from the shoulder along an angle of about 30° to about 45° with respect to the distal end of the flange.

12. A sealable lid assembly for an opening of a vessel, comprising:
    a flange extending outwardly from the vessel to a distal end and surrounding the opening to define a manhole;
    at least one wall extending from the flange proximate the distal end, the wall and the flange defining a channel for receiving a gasket;
    a lid pivotally and telescopically mounted to the vessel capable of releasably and sealably engaging the gasket disposed within the channel;
    at least one wheel rotatably mounted to lid;
    at least one elongated track extending outwardly from the vessel in a position to engage the at least one wheel and raise the lid vertically above the flange as the lid pivots; and
    at least one clamp assembly releasably contracting the lid into sealable engagement with the flange.

13. The sealable lid assembly as claimed in claim 12, further comprising a handle extending outwardly from the lid for assisting an operator in raising and pivoting the lid.

14. The sealable lid assembly as claimed in claim 12, further comprising a gasket disposed within the channel releasably and sealably engaging the lid.

15. The sealable lid assembly as claimed in claim 12, wherein the at least one clamp assembly comprises:
    a threaded bolt pivotally mounted to the vessel;
    a wing nut having mating threads rotatably disposed on the bolt; and
    a receiver mounted to the lid and having a U-shaped slot capable of receiving the bolt, whereby the lid is sealed by placing the bolt into the U-shaped slot and rotating the wing nut in one direction to exert pressure against the receiver and released by rotating the wing nut in the opposite direction and pivoting the bolt out of the U-shaped slot.

16. The sealable lid assembly as claimed in claim 12, wherein the at least one clamp assembly comprises:
    a clamp pin mounted to the vessel and
    a J-shaped clamp positioned on the lid to removably engage the clamp pin,
    whereby the lid is sealed by engaging the J-shaped clamp with the clamp pin and release by disengaging the J-shaped clamp from latch pin.

17. The sealable lid assembly as claimed in claim 12, wherein the lid comprises a substantially dome-shaped top and a substantially planar bottom, wherein the top and bottom in combination define a chamber.

18. The sealable lid assembly as claimed in claim 17, further comprising a protrusion extending from the bottom and insertable into the channel.

19. The sealable lid assembly as claimed in claim 17, further comprising insulation disposed within the cavity.

20. The sealable lid assembly as claimed in claim 12, wherein the at least one track has a rounded shoulder and an elongated ramp extending from the shoulder along an angle of about 30' to about 60' with respect to the distal end of the flange.

* * * * *